Feb. 22, 1927. 1,618,589

E. S. HORWITZ

BED, FOLDING BED, OR ANY SUBSTITUTE FOR BEDS

Filed July 3, 1925

EDWARD S. HORWITZ.
Inventor.

By:- Ben V. Zillman
Attorney.

Patented Feb. 22, 1927.

1,618,589

UNITED STATES PATENT OFFICE.

EDWARD S. HORWITZ, OF ST. LOUIS, MISSOURI.

BED, FOLDING BED, OR ANY SUBSTITUTE FOR BEDS.

Application filed July 3, 1925. Serial No. 41,407.

My invention relates to an improvement in a bed, folding-bed or any substitute for a bed such as a davenette, davenport, divan, sofa, or lounge having a closed frame-work at either front or back or any sort of framework to which said improvement may be attached and installed, said improvement consisting of a mirror having either a wood or a metal frame, said frame and mirror fitting into a wood or a metal frame, attached to or built in the frame-work of the day-bed, davenette, davenport, divan, sofa, lounge, folding-bed or bed, the said attached or built-in frame-work having a slot into which the mirror and its frame fits, the object being to provide a mirror which can be exposed for use by raising it into view when necessary, and which can be made to disappear when not in use, or when so desired, and which is capable of adjustment to any degree of height, from complete disappearance, when let down out of view, to its full length, when pulled up to its entire height, without any manipulation other than simply raising or lowering the mirror to its desired height by means of a small strap or handle attached to the top of the frame-work of the mirror, the mirror being at all times held securely in place by means of two springs, one being attached to each side of the inner slot of the frame-work into which the mirror and its frame-work fits.

I attain these objects by the mechanism illustrated in the accompanying drawing, in which—

Figure 1:
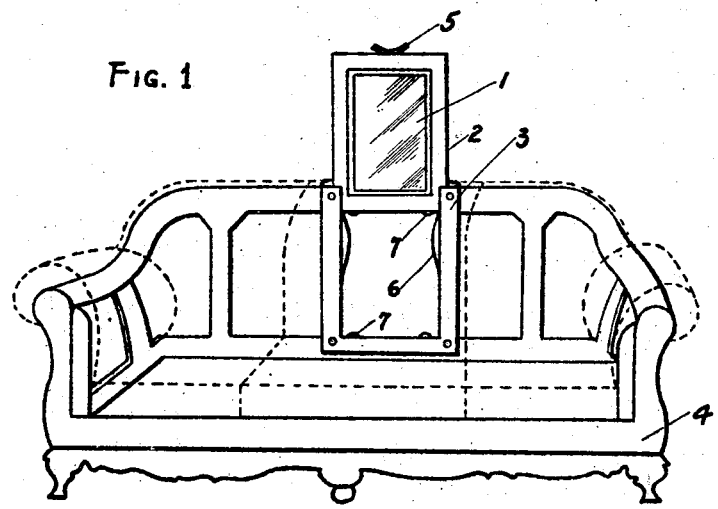
Figure 2:
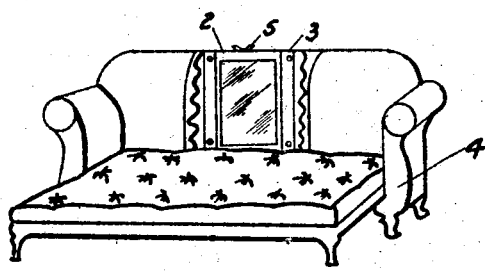
Figure 3:
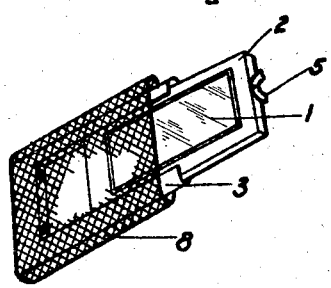

Figure 1 is a skeleton sketch of the entire bed, divan, lounge, davenport or davenette, showing its frame-work, the built-in framework into which the mirror fits, and the mirror in its raised position, held up by the springs; Figure 2, the bed, divan, lounge, davenport or davenette open as a bed, with the mirror in its concealed position; Figure 3, the mirror and frame-work which is built in, or attached to the frame-work of the bed, divan, lounge, davenport or davenette, showing the slots into which the mirror and its frame fits, and in which it can be made to slide up or down, in any degree of visibility.

Similar numerals refer to similar parts throughout the several views.

1 is the mirror set in a wood or metal frame, movable up and down so as to conceal mirror when not in use when lowered, and to expose it for use when raised. In Figure 1, mirror 1 is raised for use. 2 is the wood or metal frame holding the mirror. 3 is the wood or metal frame built into, or fastened to the frame-work of the bed, divan, lounge, davenport or davenette, said frame having a slot into which the mirror and its frame fits. 4 is the frame of the bed, divan, lounge, davenport or davenette, to which frame 3 is fastened. 5 is the strap or handle to raise or lower the mirror. 6 is the spring fastened on each side of frame 3, in the slot. 7 are two rubber buttons fastened to the inside of the bottom of frame 3, and two more rubber buttons fastened to bottom of frame 2 of mirror, to absorb the shock when mirror is lowered.

In Figure 2, mirror 1 is lowered, and not in use. Mirror can be raised, lowered, or adjusted to any height, either when bed is opened or closed.

Frame 3 is vertical, at an angle of 90 degrees to the bed portion of the bed, divan, lounge, davenette or davenport, so that when the mirror is raised, it reflects object at an equal angle on its entire surface. (It does not slant.)

Figure 3 represents the improvement in its entirety, showing the mirror and its frame sliding into the slot of the frame-work which is built in or attached to the bed, davenette, davenport, divan, sofa, or lounge.

The shaded portion, 8, represents a wire netting, or wood or metal panel attached to the front and back of the built-in frame-work, to protect the mirror.

I claim:

In an article of furniture, means for slidably receiving a mirror vertically and releasably holding the latter at any desired elevation intermediate its top and bottom positions, said means comprising a frame channel-shaped in cross-section and adapted to be fixed entirely within said article of furniture, said frame comprising a pair of spaced, vertical guide members open at their upper ends and connected at their lower ends, said mirror being slidably engageable with said spaced, vertical guide members of the frame, and a sheet of protective material extending across the face of the mirror and frame and adapted to be arranged together therewith as a unit within said article of furniture.

EDW. S. HORWITZ.